US007340442B2

(12) United States Patent
Jeanblanc et al.

(10) Patent No.: US 7,340,442 B2
(45) Date of Patent: Mar. 4, 2008

(54) METHODS AND SYSTEMS FOR COLLABORATING COMMUNITIES OF PRACTICE

(75) Inventors: Anne Hicks Jeanblanc, Elizabeth, IL (US); James Michael Coffey, Dunlap, IL (US); Benjamin Eugene Newman, Kewanee, IL (US)

(73) Assignee: Caterpillar Inc., Peoria, IL (US)

( * ) Notice: Subject to any disclaimer, the term of this patent is extended or adjusted under 35 U.S.C. 154(b) by 212 days.

(21) Appl. No.: 11/261,578

(22) Filed: Oct. 31, 2005

(65) Prior Publication Data
US 2006/0112054 A1 May 25, 2006

Related U.S. Application Data

(63) Continuation-in-part of application No. 09/995,822, filed on Nov. 29, 2001, now Pat. No. 7,127,440.

(51) Int. Cl.
*G06F 17/00* (2006.01)
*G06N 5/02* (2006.01)
(52) U.S. Cl. .............................. 706/46; 706/14; 706/11
(58) Field of Classification Search ................ 706/46, 706/14, 11; 709/246
See application file for complete search history.

(56) References Cited

U.S. PATENT DOCUMENTS

| | | | |
|---|---|---|---|
| 5,006,998 A | 4/1991 | Yasunobu et al. | |
| 5,557,515 A | 9/1996 | Abbruzzese et al. | |
| 5,706,452 A | 1/1998 | Ivanov | |
| 5,862,223 A | 1/1999 | Walker et al. | |
| 5,875,431 A | 2/1999 | Heckman et al. | |
| 5,890,132 A | 3/1999 | Sanders | |
| 5,924,072 A | 7/1999 | Havens | |
| 5,948,054 A | 9/1999 | Nielsen | |
| 6,026,148 A | 2/2000 | Dworkin et al. | |
| 6,038,537 A | 3/2000 | Matsuoka | |
| 6,038,543 A | 3/2000 | Kurosawa | |
| 6,044,354 A | 3/2000 | Asplen, Jr. | |
| 6,115,709 A | 9/2000 | Gilmour et al. | |
| 6,128,646 A | 10/2000 | Miloslavsky | |
| 6,195,657 B1 | 2/2001 | Rucker et al. | |
| 6,205,472 B1 | 3/2001 | Gilmour | |
| 6,955,873 B1* | 10/2005 | Blum | 435/6 |
| 7,177,851 B2* | 2/2007 | Afeyan et al. | 706/13 |
| 2001/0029322 A1* | 10/2001 | Iliff | 600/300 |
| 2001/0034686 A1* | 10/2001 | Eder | 705/36 |
| 2002/0073080 A1 | 6/2002 | Lipkin | |

(Continued)

OTHER PUBLICATIONS

Ghislaine Reybet-Degat et al., Multisensor Fusion with a Pattern Recognition Approach: Parametrid Case, 1995, IEEE, 0-7803-2559-1/95, 1386-1391.*

*Primary Examiner*—Joseph P Hirl
(74) *Attorney, Agent, or Firm*—Finnegan, Henderson, Farabow, Garrett & Dunner

(57) ABSTRACT

Methods and systems for collaborating communities of practice are disclosed. In one embodiment, a method is disclosed for collaborating communities of practice in a community of practice environment. Each community of practice includes a goal. The method may include searching information associated with each of the communities of practice for related information and identifying a set of communities of practice having related information. Further, the method may include determining whether any of the communities of practice in the set are related and establishing a collaborative communication session between the related communities of practice such that the related communities of practice share resources in achieving their respective goals.

20 Claims, 7 Drawing Sheets

U.S. PATENT DOCUMENTS

2002/0073236 A1* 6/2002 Helgeson et al. ........... 709/246
2002/0120619 A1* 8/2002 Marso et al. .................. 707/3
2002/0138590 A1 9/2002 Beams et al.
2003/0023686 A1 1/2003 Beams et al.
2003/0088458 A1* 5/2003 Afeyan et al. ................ 705/10
2003/0229529 A1 12/2003 Mui et al.

* cited by examiner

METHODS AND SYSTEMS FOR COLLABORATING COMMUNITIES OF PRACTICE

CROSS REFERENCE TO RELATED APPLICATION

This application is a continuation-in-part of U.S. patent application Ser. No. 09/995,822, filed Nov. 29, 2001 now U.S. Pat. No. 7,127,440, entitled "Knowledge Management System and Method," which is incorporated herein by reference in its entirety.

Further, this application is related to U.S. patent application Ser. No. 11/261,576, filed Oct. 31, 2005, entitled METHODS AND SYSTEMS FOR MANAGING KNOWLEDGE DOCUMENTS, U.S. patent application Ser. No. 11/261,577, filed Oct. 31, 2005, entitled METHODS AND SYSTEMS FOR PROVIDING KNOWLEDGE DOCUMENTS, and U.S. patent application Ser. No. 11/261,575, filed Oct. 31, 2005, entitled METHOD AND SYSTEM FOR DELIVERING COMMUNITY KNOWLEDGE, each of which is incorporated by reference in its entirety.

TECHNICAL FIELD

The present invention relates generally to knowledge management, and more particularly, to a method and system for gathering, managing, and sharing knowledge in a community of practice.

BACKGROUND

Organizations, such as businesses, often rely heavily on knowledge within the organization itself. One example of this reliance is training. Experienced employees are often called upon to train new employees. In addition to training the new employee how to do the job, the experienced employee may also share advice based on lessons the experienced employee learned by doing the same job. Another example is a "resident expert." Often an employee, through education or experience or both, has become particularly knowledgeable about a topic. Other employees who need advice or information about this topic may contact the "resident expert." Other examples of important corporate knowledge are internal standards. Internal standards for a procedure or product may be generated and updated by the persons in the organization who are responsible for the procedure or product. The internal standards may be used by the responsible team to ensure that procedures and policies are followed. Further, the internal standards may be used as a guide to quickly train new members of the team. Finally, internal standards may be used by other divisions of the organization as a basis for forming their own standards or for interacting with the responsible team.

Organizational knowledge may be very valuable to an organization. A number of problems exist, however, which may cause the organization to not fully utilize, or even realize the extent of, this organizational knowledge. One problem is that organizational knowledge is often not captured from the knowledgeable employee and documented for use by others. Unless knowledge is documented, it is possible that others within the organization will not be able to determine where particular organizational knowledge resides, and thus the knowledge will be underutilized. Additionally, if a knowledgeable employee leaves the organization without first documenting his knowledge, that knowledge will be lost to the organization. Another problem is that, while an employee may be particularly knowledgeable, until that knowledge has been identified, other persons in the organization (including in other divisions of the organization) may be unaware of the existence of the "resident expert."

Further, many organizations are becoming increasingly globalized. For example, one company may have corporate headquarters located in one state, research and development facilities located in a second state, manufacturing operations in a number of other states, and retail facilities worldwide. Part of the reason for this globalization is the ease with which communications between these locations may occur. While the technology exists to permit interaction and collaboration among persons at different locations in the organization, current systems do not provide sufficient structure to identify sources of knowledge and enable interaction between persons having knowledge and persons seeking knowledge. Not only does the organizational knowledge need to be globally accessible, but interaction must also be supported.

Finally, in addition to merely capturing the knowledge, it is most effective to provide for interaction and collaboration based on the knowledge. Rather than simply requesting persons to submit any knowledge that they might have, even if directed to a particular topic, it is effective to instead focus the interested persons on a project, goal, or purpose. From the interaction and collaboration that follows based on the project, the knowledge can be captured and documented.

In addition to systems that permit limited interaction, systems also exist that permit some documentation of organizational knowledge. Some of these systems may include mere cataloging of information or mere answering of questions. These systems, however, are limited to a single facet of knowledge, such as "best practices" or internal standards. The systems may also be limited in the persons that may participate. Additionally, these systems are often relatively static and non-interactive. For example, some of these systems may be simply a list of frequently asked questions. At best, some systems refer a user to the person who supplied the knowledge that the user is accessing. The currently available systems do not provide sufficient interaction and/or collaboration with other users to achieve a common purpose based on the knowledge, nor do the current systems provide a dynamic, constantly updating knowledge system. One exemplary existing system is described in U.S. Pat. No. 5,924,072, entitled "Knowledge Management System and Method." This system provides for the submission of knowledge items by a user, as well as the use of the knowledge items by a second user. The second user may submit feedback about the knowledge item. However, there is no interaction or collaboration between the users; further, the system is designed merely to acquire knowledge.

Additionally, existing systems do not provide an environment that identifies related communities of practice and allows these communities to collaborate and/or merge into a single community of practice.

The present invention is directed to overcoming one or more of the problems or disadvantages associated with the prior art.

SUMMARY OF THE INVENTION

Methods and systems for collaborating communities of practice are disclosed. In one embodiment, a method is disclosed for collaborating communities of practice in a community of practice environment. Each community of practice includes a goal. The method may include searching information associated with each of the communities of practice for related information and identifying a set of communities of practice having related information. Further, the method may include determining whether any of the communities of practice in the set are related and establishing a collaborative communication session between the related communities of practice such that the related communities of practice share resources in achieving their respective goals.

In another embodiment, a system for collaborating communities of practice is disclosed. The system may include a community of practice environment including communities of practice that each include members and have a respective goal. Further, the system may include a knowledge management architecture configured to identify a first set of communities of practice that are related and set up a collaborative communication session between the communities of practice in the first set. The collaborative communication session may enable the communities of practice in the first set to share resources to achieve their respective goals.

It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate exemplary embodiments of the invention and together with the description, serve to explain the principles of the invention. In the drawings.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

A system and method are provided to capture, manage, and share knowledge within an organization. The system and method of the present invention are not limited to knowledge management within an organization, but may be used to facilitate the capture, management, and sharing of knowledge within any organized group of persons working for common goals or purposes. Specifically, a community of practice is formed to facilitate the capturing, managing, and sharing of knowledge. A community of practice is a group of persons (most typically in a single organization) grouped together for a common purpose or to achieve a common goal. For example, a community of practice may be formed to develop a training program for employees in a division, or to create a set of standards for a new product line. A community of practice is not necessarily based on formal divisions within the organization, but may include members from many divisions who are involved in an aspect of the organization or a particular project. Also included in the community of practice is a set of procedures, best practices and standards that the community of practice can use in working towards the purpose or goal. After the goal or purpose is accomplished, the community of practice can continue as an organizational resource.

Figure 1:
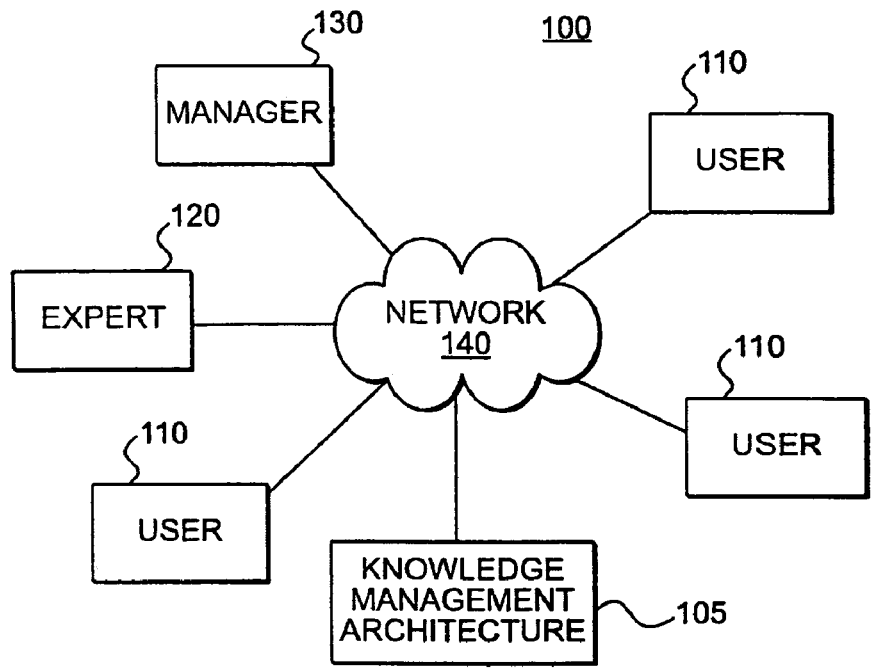
FIG. 1 is a block diagram of an exemplary community of practice consistent with one embodiment of the present invention.

FIG. 1 illustrates an exemplary community of practice 100, consistent with one embodiment of the present invention. As shown in FIG. 1, community of practice 100 includes a knowledge management architecture 105, a plurality of users 110, an expert 120, and a community of practice manager 130, all interconnected by network 140. Knowledge management architecture 105 facilitates interaction among the participants (namely, users 110, expert 120, and manager 130) in community of practice 100. Knowledge management architecture 105 also maintains knowledge entries. Users 110 interact with other users 110, expert 120, and community of practice manager 130 via network 140, for example, by posing questions or responding to the questions of others. Users 110 may also access knowledge entries via knowledge management architecture 105. Further, users 110 may submit their own knowledge to be added to knowledge management architecture 105. Users 110 may interface with community of practice 100 using personal computers, work stations, or other devices connected to network 140.

Expert 120 is similar to user 110, but has been identified within community of practice 100 as having special knowledge. Users 110 may obtain the status of expert 120 through, inter alia, significant participation in a community of practice. In addition to interacting with other entities in community of practice 100 and submitting and accessing knowledge, expert 120 may participate in approving knowledge submitted by users 110. Although only one expert 120 is illustrated in FIG. 1, community of practice 100 may include a plurality of experts.

Community of practice manager 130 functions as the facilitator and moderator for community of practice 100. Community of practice manager 130 may be responsible for review, validation, and dissemination of knowledge in the community of practice. Community of practice 100 may include one or more community of practice managers.

Network 140 may be the Internet, a wireless local area network (LAN), or another type of network. Network 140 is intended in its broadest sense to encompass any communications system.

Figure 2:
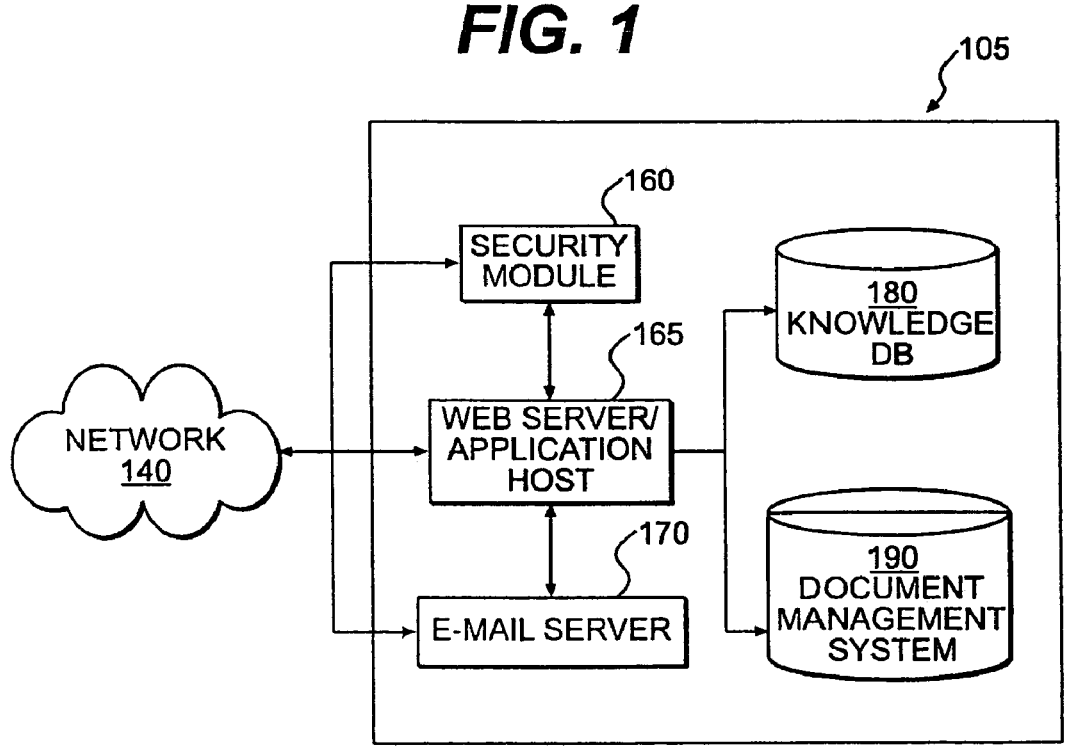
FIG. 2 is a block diagram of an exemplary knowledge management architecture consistent with one embodiment of the present invention.

FIG. 2 is a block diagram illustrating an exemplary knowledge management architecture 105. Knowledge management architecture 105 may include a security module 160, a Web server/application host module 165, an e-mail server 170, a knowledge database 180, and a document management system 190. Security module 160, Web server module 165, and e-mail server 170 interface with network 140. Web server module 165 is connected to e-mail server 170. Web server module 165 is also connected to knowledge database 180 and document management system 190. It is contemplated that a knowledge management system of the present invention may include some or all of the components of FIG. 2.

Security module 160 may determine what type of access each entity in community of practice 100 has with respect to knowledge database 180 and/or the document management system 190. For example, users 110 may access knowledge in knowledge database 180 but may not alter the knowledge. Further, users 110 who wish to add knowledge to knowledge database 180 may require approval of the knowledge before the knowledge is added. Expert 120 and/or community of practice manager 130, on the other hand, may be permitted access to knowledge database 180, as well as the ability to alter knowledge database 180. Further, security module 160 may be used to permit different levels of access to different users, based on, for example, subscription status. For example, anonymous users 110 may be permitted access to only a portion of knowledge database 180, whereas registered users 110 may access the entire knowledge database. While security is important, access is important to achieve interaction and collaboration, and security should be minimized if possible.

Web server/application host module 165 includes an interface for entities to access knowledge database 180, as well as document management system 190. Further, web server module 165 may include additional capabilities, such as collaboration tools to permit entities in community of practice 100 to work together, bulletin boards to permit entities in community of practice 100 to communicate with each other, and/or search engines to provide efficient access to specific knowledge entries in knowledge database 180 or document management system 190. Web server module 165 may also permit entities in community of practice 100 to submit knowledge to be added to knowledge base 180. An exemplary web server application is ColdFusion® by Allaire.

E-mail server 170 provides users 110, expert 120, and community of practice manager 130 with updated information from knowledge management architecture 105. For example, when a new knowledge entry has been approved, e-mail server 170 may forward the knowledge entry to the other entities in the community of practice 100. Alternatively, e-mail server 170 may forward notice of the availability of a new knowledge entry, tool, or standard that may be accessed using Web server module 165.

Knowledge database 180 contains approved knowledge entries, standards, tools, and other information used by entities in community of practice 100. Knowledge management architecture 105 may include one or more knowledge databases 180.

Document management system 190 provides access to documents stored in a number of different formats, such as word processing format, spread sheet format, or presentation format. Document management system 190 permits more rapid capture of knowledge, because documents do not need to be converted before they can be shared with the community of practice.

Figure 3:
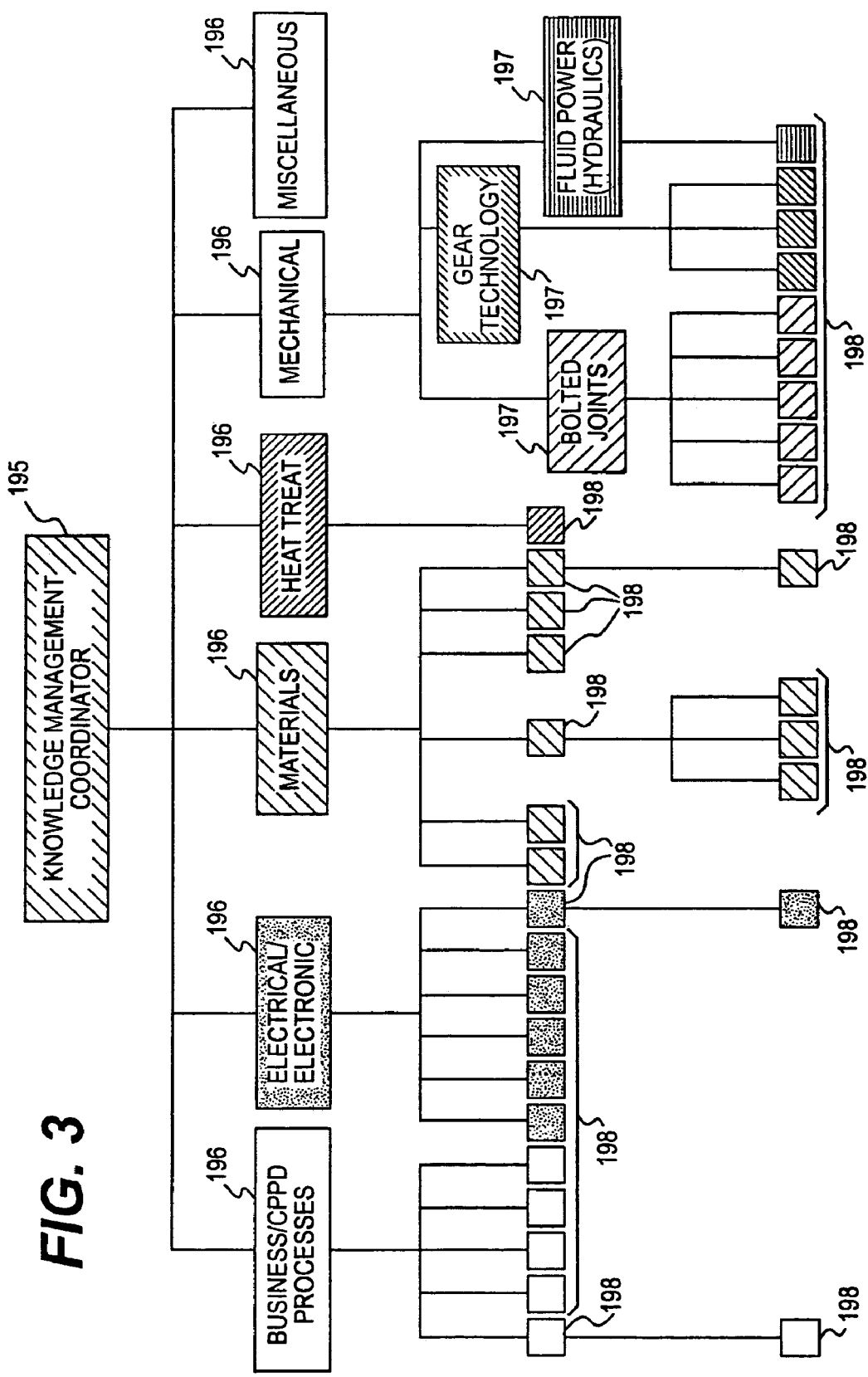
FIG. 3 is a block diagram of an exemplary knowledge management system consistent with one embodiment of the present invention.

FIG. 3 illustrates an exemplary knowledge management system for an organization, consistent with one embodiment of the present invention. For example, the knowledge management system may include a knowledge management coordinator 195, one or more community groups 196, and one or more communities of practice 198. The one or more community groups may also include one or more sub-community groups 197. Knowledge management coordinator 195 oversees community groups 196 and communities of practice 198. Community groups 196 are logical divisions that may facilitate operation of communities of practice 198 by grouping communities of practice 198 with similar interests or goals. In the exemplary knowledge management system of FIG. 3, the community groups 196 include "Business/CPPD Processes," "Electrical/Electronic," "Materials," "Heat Treat," "Mechanical," and "Miscellaneous." As illustrated in FIG. 3, the "Mechanical" community group may include sub-community groups 197, which include more specific subject areas.

Figure 4:
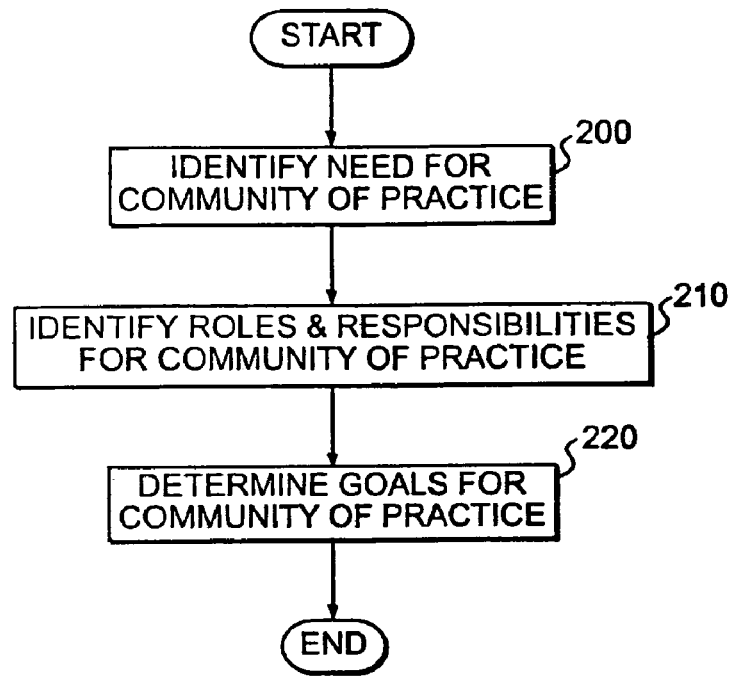
FIG. 4 is an exemplary flow chart illustrating a method for creating a community of practice, consistent with one embodiment of the present invention.

FIG. 4 illustrates an exemplary flow chart of a method for establishing a community of practice. First, a need for a community of practice is identified, for example, by identifying knowledge building activities (step 200). Knowledge building activities may include any activity where problems may be identified, solutions may be generated, or any other body of knowledge may be gathered or created. For example, knowledge building activities may include problem-solving activities, team meetings, firm-wide retreats, or new product designs or launches. A knowledge management coordinator, who may oversee the operation of a number of communities of practice for the organization, may be notified of the new community of practice and may assist with the formation of the new community of practice.

Next, the roles and responsibilities of the community of practice are identified (step 210). One or more community of practice managers may be identified to organize the community of practice and to facilitate and moderate interaction among participants. One or more experts may be associated with the community of practice. In addition, relevant documentation may be identified and collected. For example, existing design guides, training materials, tools, standards, and regulations may be added to the knowledge database (or alternatively, be made available through the document management system). Depending on the roles of various participants in the community of practice, security levels and requirements may also be established. Responsibilities of an expert may include approving knowledge entries submitted by users or periodically answering questions posted via the community of practice. Responsibilities of a manager may include approving knowledge entries submitted by users, organizing interaction between participants in the community of practice, and encouraging participants to work towards the achievement of the goals of the community of practice. It may also be determined to what extent users may participate, and whether different users may have different access to knowledge database. Participants in the community of practice may, if appropriate, receive training in order to enhance their usage of the community of practice.

Goals for the community of practice are then determined (step 220). The goals of the community of practice may include the goals or purposes for which the community of practice was formed. For example, goals may be product-oriented, such as creating a design guide for a new product or developing a software product for testing a new product. Goals may also be information-oriented, such as distributing information from recent symposia or meetings or collecting feedback from organizational locations worldwide to determine required improvements. Further, goals may be career-oriented, such as developing training programs for new employees and providing networking between persons in the organization. Another method for determining goals for the community of practice includes determining what knowledge is missing or what knowledge should be updated. The goal of a community of practice, as encompassed by the present invention, is not the mere cataloging of information within an organization nor the mere answering of questions.

Figure 5:
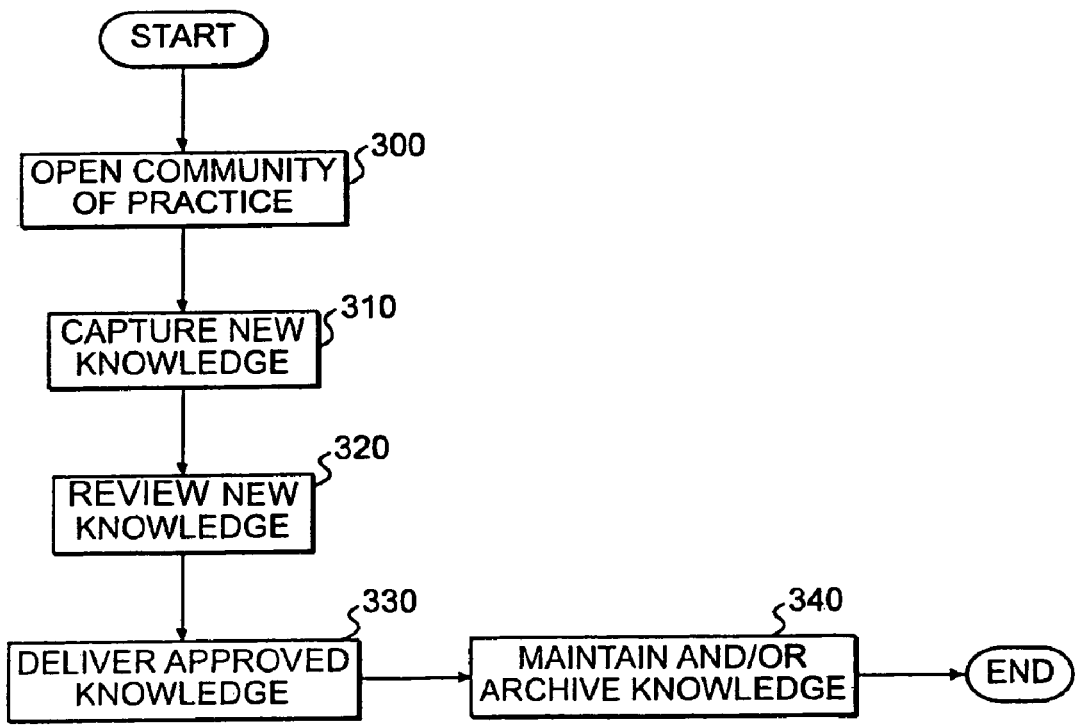
FIG. 5 is an exemplary flow chart illustrating a method for managing knowledge, consistent with one embodiment of the present invention.

FIG. 5 is an exemplary flowchart illustrating a method for capturing, managing, and sharing knowledge in an established community of practice. Once a community of practice is established, the community of practice is opened (step 300). The community of practice may be advertised within the organization, for example, via company newsletters, e-mails, or other media. Persons wishing to join a community of practice may be asked to enroll or subscribe in the community of practice. There may be different levels of membership, each having a level of security associated. Alternatively, all users may have access to all parts of the knowledge database associated with the community of practice.

The community of practice then may capture new knowledge (step 310). New knowledge may be submitted by users, or may be gathered from interactions (for example, via electronic bulletin board or other collaborative tool) between users via knowledge management architecture 105. Knowledge may include explanations of a situation, commentary on a situation, suggestions for improving a situation, links or references to supporting material, or suggestions of persons who may have additional knowledge. Knowledge may also include information about the person supplying the knowledge. Knowledge may be left in its original format, including word processing, spread sheet, or presentation format. Knowledge that is not in electronic format may be scanned to create an electronic document that may then be attached to electronic mail or messages. By leaving knowledge in the original format, the substance can be reviewed and fine-tuned prior to any conversion.

Next, the captured knowledge is reviewed (step 320). The knowledge may be reviewed to determine if the material is accurate, complete, and/or validated. The knowledge entry may be reviewed by the community of practice manager and/or the expert. Alternatively, the knowledge entry may be reviewed by a review team consisting of a number of persons and resources from within the organization or community of practice.

Once the knowledge entry has been approved, it is delivered (step 330). Delivery of knowledge may include e-mailing the entry to all users who have subscribed to the community of practice. Alternatively, the knowledge entry may be made available for browsing via a Web site associated with the community of practice. Delivered knowledge may also include information about validation and future plans. Further delivered knowledge may include the capability to comment on the knowledge, as well as links to obtain more information or related knowledge. The delivered knowledge may have the capability to be forwarded to non-community of practice members.

Finally, knowledge entries are maintained and/or archived (step 340). Specifically, knowledge entries, such as standards, design guides, training materials, or other procedural information may be validated and updated based on the new knowledge entries. Maintenance of these knowledge entries may include version tracking or other organizational procedures to ensure that the current documents and procedures are being followed. Knowledge entries may also be archived for later use.

The community of practice may also be monitored based on standard metrics, such as usage (such as number of times the knowledge database is accessed), time to market, or other criteria. Once it has been determined that the goals or purposes of the community of practice have been achieved, the community of practice can function as an effective resource for the organization.

ALTERNATIVE EMBODIMENTS

Methods and systems consistent with the disclosed embodiments enable members to create, search, and share knowledge to achieve one or more goals of a community of practice. In some instances, multiple communities of practice may exist that each have access to assigned knowledge for their respective community. Accordingly, knowledge may exist that is related between the communities. Further, multiple communities of practice may be tasked with similar goals, and thus use similar resources and knowledge. As such, the disclosed embodiments implement systems and methods that identify related communities of practice and allow these communities to collaborate by sharing information, such as knowledge, to achieve their respective goals. In some embodiments, the related communities may be merged into a single community of practice.

Figure 6:
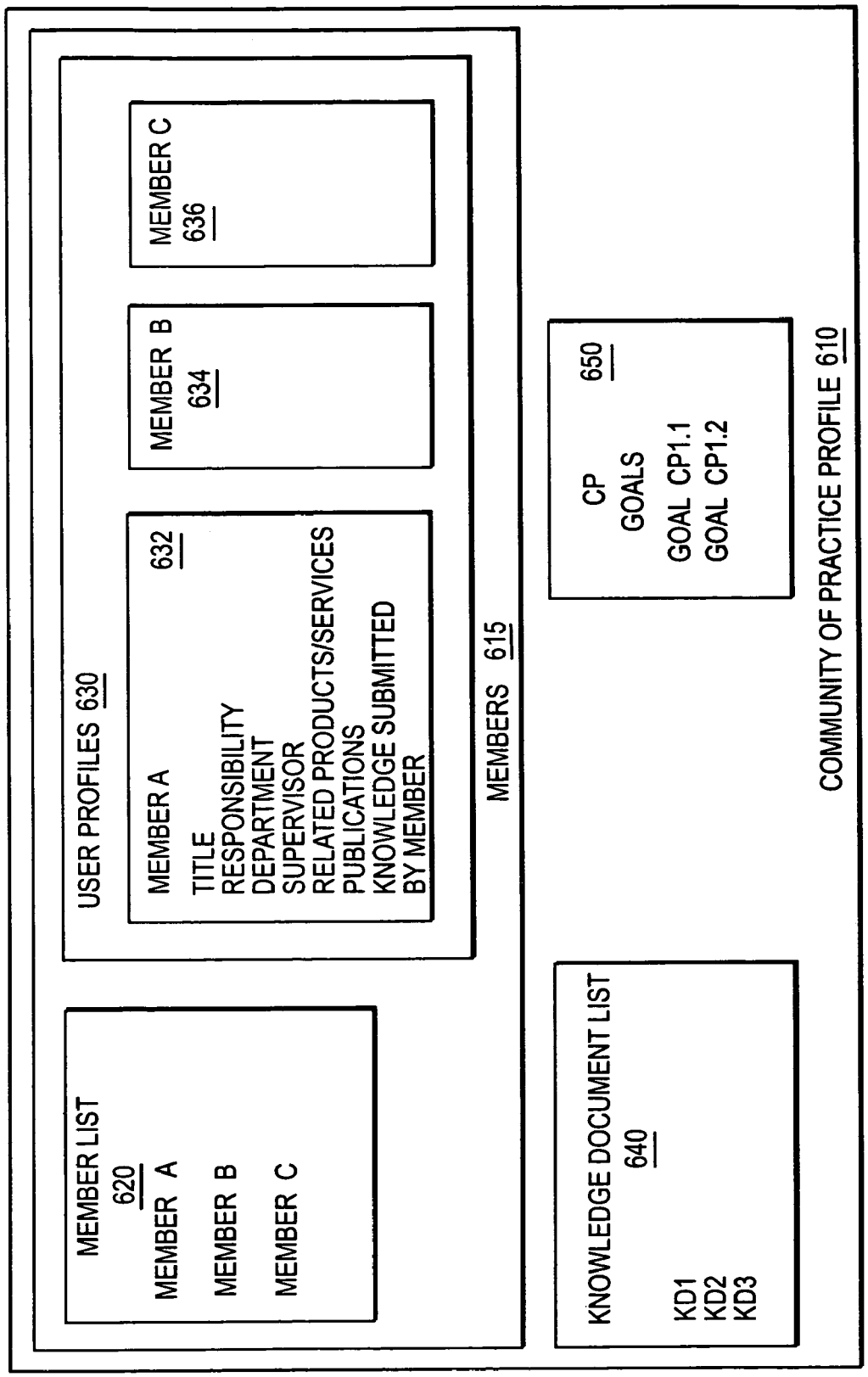
FIG. 6 is a block diagram of an exemplary community of practice profile, consistent with certain disclosed embodiments.

To identify related communities of practice, the disclosed embodiments may maintain information reflecting characteristics of each community of practice included in a community of practice environment. This information, in some embodiments, may be in the form of profile data, which may be stored in a memory space that is located in a central database (e.g., within architecture 105) or distributed across remote memory devices (e.g., located in memory devices within computer systems associated with a community of practice or a community of practice group. FIG. 6 shows a block diagram of an exemplary community of practice profile 610 consistent with certain disclosed embodiments. As shown, profile 610 may include member information 615, knowledge document information 640, and goal information 650.

Member information 615 may include data reflecting characteristics of members of a particular community of practice. For instance, member information 615 may include a member list 620 that identifies all members included in the community of practice (e.g., members A, B, and C). Further, member information 615 may also include user profiles 632, 634, and 636 associated with each member in the community of practice. A user profile may include data reflecting information associated with a respective member, including, for example, the member's title in an organization, a description of job responsibilities, identification of the department within the organization where the member works, the member's supervisor, products or services associated with the member's job responsibilities (e.g., products or services the member provides, works with, designs, produces, markets, etc.), any publications from the member, identification of any knowledge submitted or authored by the member for the community of practice, and any other type of information associated with a member, such as preferences for communication deliveries, etc.

Knowledge document list 640 may identify all of the knowledge documents assigned to the community of practice (e.g., KD1, KD2, and KD3). Community of practice goals (650) may include data describing one or more goals (e.g., CP1.1, CP1.2) the community of practice is attempting to achieve. Goals 650 may also include additional information associated with each of the community of practice goals, such as the status of each goal (e.g., in progress, completed, almost complete, etc.), the resources utilized to achieve the current status (e.g., knowledge, members, hardware, software, etc.), etc. Although FIG. 6 shows community of practice profile 610 including certain information, the disclosed embodiments are not limited to these examples. Any type of information associated with the community of practice may be included in profile 610.

Figure 7:
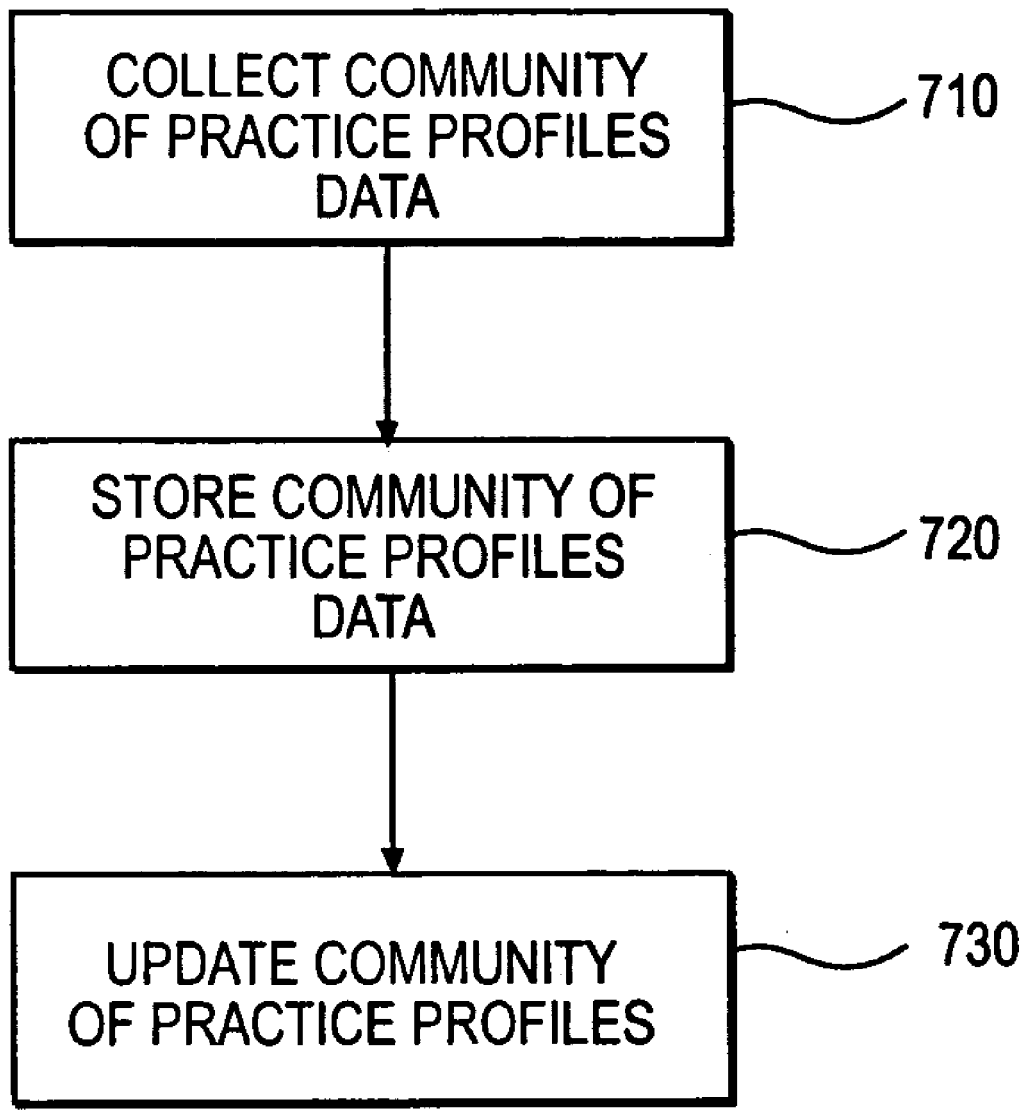
FIG. 7 is a flowchart diagram of an exemplary community of practice profile management process, consistent with certain disclosed embodiments.

In certain embodiments knowledge management architecture 105 maintains and manages community of practice profiles for one or more community of practices included in a community of practice environment, such as an environment shown in FIG. 3. FIG. 7 shows a flowchart of an exemplary community of practice profile management process consistent with these embodiments. Knowledge management architecture 105 may collect community of practice profile data from each community of practice in an environment (Step 710). For example, architecture 105 may issue requests for new community of practice information to a community of practice. In response, a representative for the community of practice, such as a manager, may provide through network 140 any community of practice profile data, such as member data, goal information, etc. Alternatively, or additionally, communities of practice may automatically send profile data to architecture 105 dynamically (e.g., as it is created) or periodically or upon request.

Once received, architecture 105 may store the community of practice profile data in a memory device (Step 720). Architecture 105 may also update a community of practice profile based on the received community of practice data (Step 730). In certain embodiments, architecture 105 may execute software processes that create a community of practice profile if one does not exist for a community of practice, such as when a new community is formed. Once created, architecture 105 may receive, store, and update community of practice profile data for the newly created community of practice profile.

Figure 8:
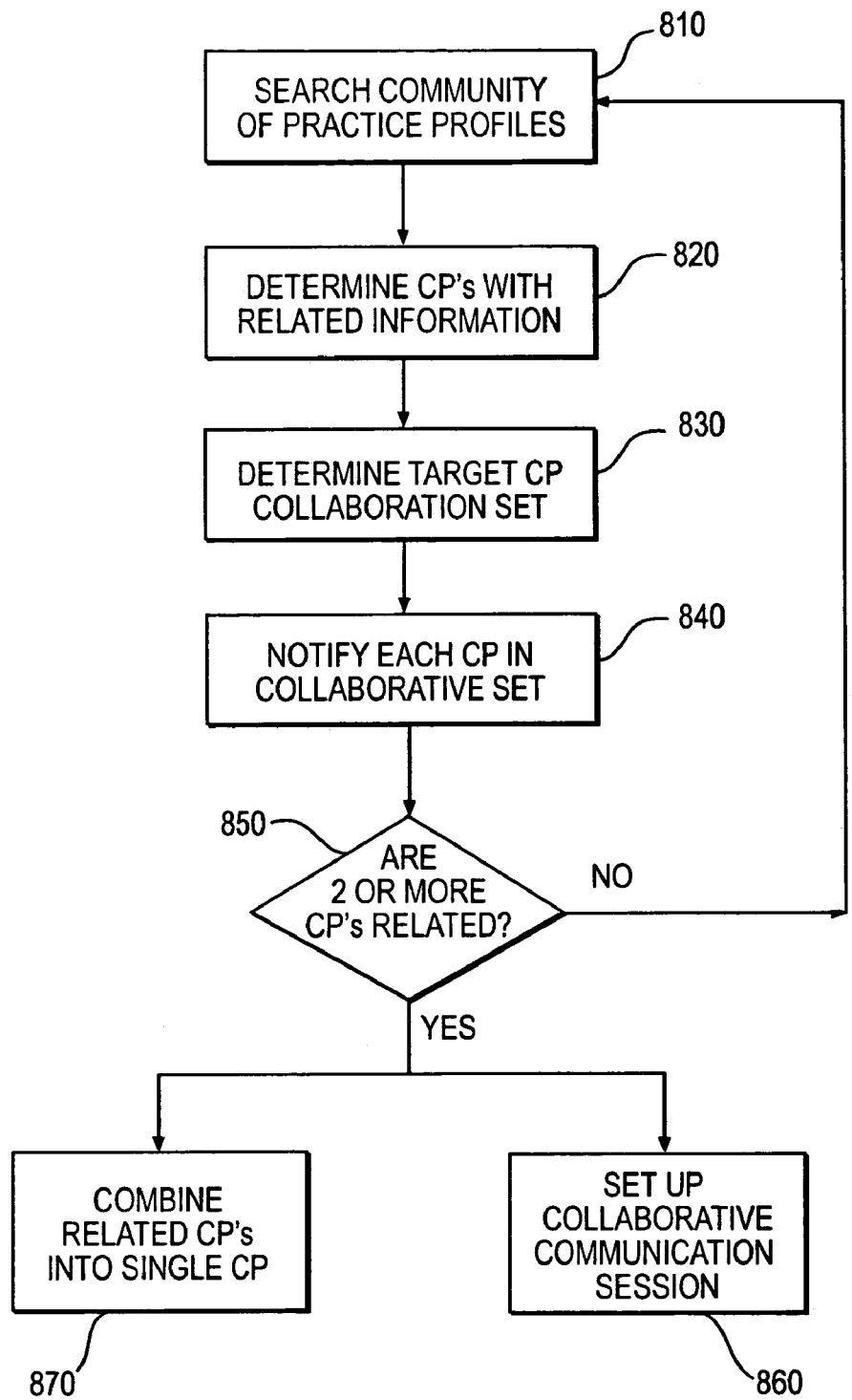
FIG. 8 is a flowchart of an exemplary community of practice collaboration process, consistent with certain disclosed embodiments.

As mentioned above, methods and systems of the disclosed embodiments provide an environment where communities of practice use knowledge to achieve their respective goals. In certain situations, two or more communities may include information that is relevant, similar, or related to each other. Accordingly, certain disclosed embodiments provide a system and method for identifying the related information and enable multiple communities to collaborate using the related information. FIG. 8 shows a flowchart of an exemplary community of practice collaboration process, consistent with certain disclosed embodiments.

Knowledge management architecture 105 may begin the process by executing software processes (automatically or in response to a user's control) that search the community of practice profiles to determine whether there are any related features between two or more communities (Step 810). Details of this process are further described in connection with FIG. 9 below.

Based on the search, architecture 105 may determine any communities of practice that have related information (Step 820). This may include two or more communities of practice. Based on this determination, architecture 105 may determine a target community of practice collaboration set that includes all of the related community of practice profiles (Step 830). Architecture 105 may then notify each community of practice associated with the profiles in the target collaboration set that there are other communities of practice that may include related information (Step 840). Architecture 105 may notify a community of practice by, for example, sending a message to a manager of the community of practice over network 140. Alternatively, architecture 105 may post a message reflecting the notification on a Web page that is accessible by a representative of the community of practice. In one embodiment, the notification provided to each community of practice may identify the type of information that is related (e.g., same members, similar goals, knowledge documents, content in publications, etc.) Other means may be employed to notify each community of practice in the collaborative set, and the above examples are not intended to be limiting.

Upon receiving notification, each community of practice within the collaborative set may determine whether the information identified by architecture 105 is related and of interest to the respective community (Step 850). For example, a member (e.g., manager, expert, user, etc.) or a group of members may review the identified information received from architecture 105 to determine whether it is related to their community of practice. Alternatively, a computer executed software process implemented in each community of practice may analyze the identified information to determine whether it correlates to information associated with the respective community performing the analysis. In one embodiment, the respective community of practice may send a response indication to architecture 105 reflecting its approval that the other community of practice information provided by architecture 105 is related to their community of practice, and thus approving collaboration with the other community or communities of practice.

If architecture 105 receives indications that the communities of practices that received the profile information are not related (Step 850; No), the process returns to Step 810. On the other hand, if architecture 105 determines that two or more communities of practice are related (Step 850; Yes), it may set up a collaborative communications session between the related communities of practice (Step 860). The collaborative communications session may be a networking or other type of communications environment where the related communities of practice may exchange or share information, resources, finds, results, expertise, etc. Thus, a first related community of practice member may use a computer system to communicate with a second related community of practice member via network 140 to determine whether their respective communities share common goals, use the same members to achieve their goals, have resources that may be used by the other community (e.g., an expert in a certain field of technology may be helpful to the other community of practice, a computer software program written by one community of practice member may be useful for the other community of practice, etc.) The two members may be community of practice managers, experts, or users of their respective communities of practice.

Alternatively, or additionally, architecture 105 may determine there are enough similarities between the communities that warrants combining them into a single community of practice (Step 870). In one embodiment, architecture 105 may base this on analysis (by a user or a computer executed software process) of the community of practice profiles of each related community. Alternatively, architecture 105 may base this determination from information received from the related communities that indicate their suggestion and/or approval of merging the related communities of practice. Further, each of the related communities of practice may determine, via one or more respective representatives, there are enough similarities between the communities that warrants combining them into a single community of practice and direct architecture 105 to initiate and manage a newly created merged community of practice.

The newly formed community of practice may combine goals from the merged communities of practice into a single related goal, or may form multiple goals reflecting the original goals of each combined community of practice. Further, software, hardware, knowledge, members, and any other type of resource may be combined. Accordingly, the newly formed community of practice is recognized and managed by knowledge management architecture 105 (and knowledge management coordinator 195) as a single community of practice. As such, architecture 105 may create a new community of practice profile for the newly formed community of practice and remove from memory the profiles of the combined communities. The newly created community of practice profile may include some or all of the profile data from each of the merged communities of practice profiles. Architecture 105 may execute software processes that eliminate redundant profile data to reserve memory space.

Figure 9:
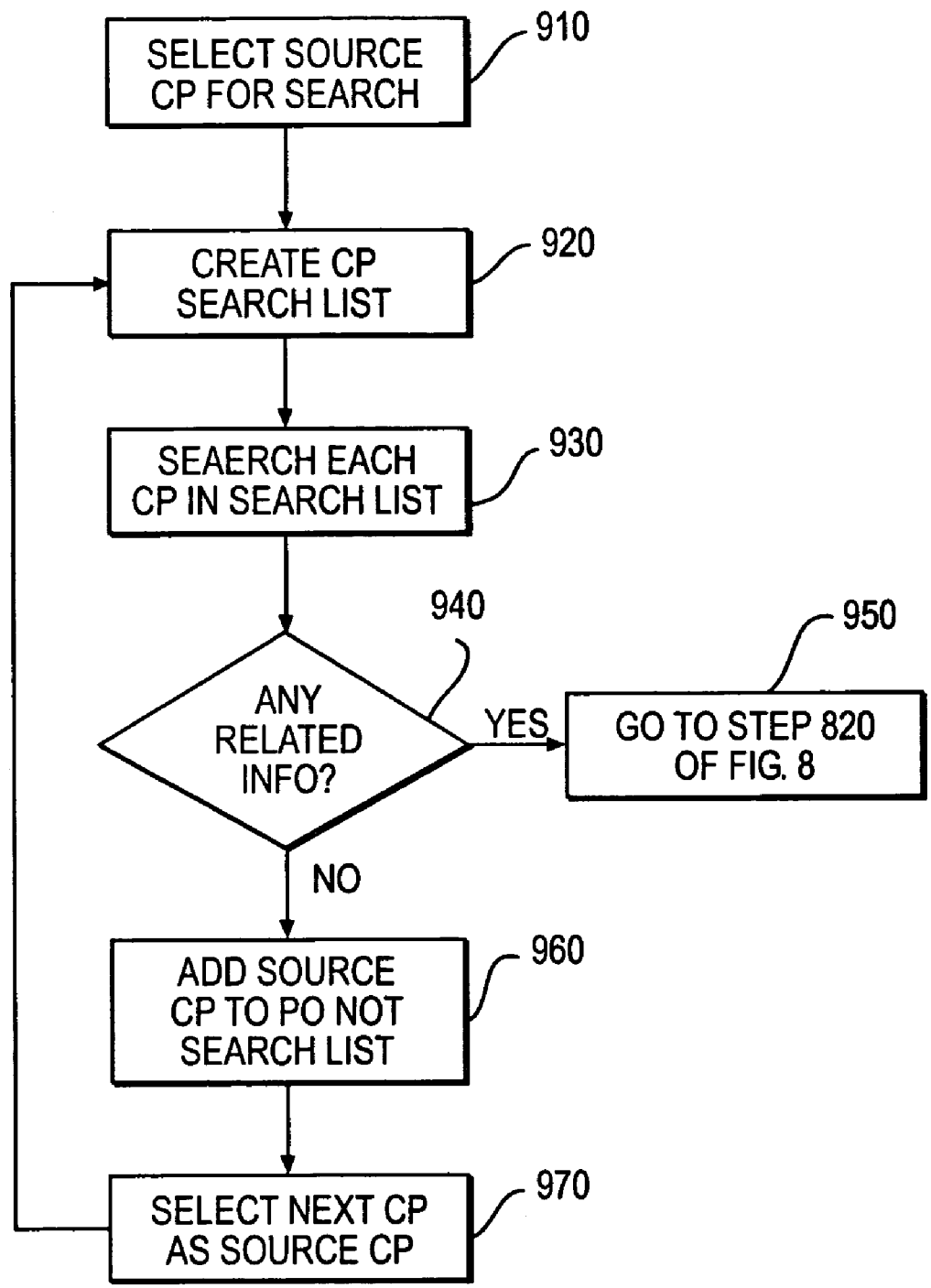
FIG. 9 is a flowchart of an exemplary community of practice search process, consistent with certain disclosed embodiments.

As explained above, architecture 105 executes software processes that may search the communities of practice profiles to identify communities with possible related information. FIG. 9 shows a flowchart of an exemplary community of practice search process consistent with certain disclosed embodiments. In one instance, architecture 105 executes software processes that automatically, or in response to a user's input via a computer system, select a source community of practice for initiating the search for related communities (Step 910). For example, in a community of practice environment including multiple communities (e.g., a first, second, and third community), architecture 105 may select a first community as a source community of practice. Next, architecture 105 may create a community of practice search list (Step 920). The search list identifies all remaining communities of practice (other than the source community) as targets for comparing community of practice profile data with the source community's profile data. In one embodiment, in constructing the search list, architecture 105 may review a do-not-search list that identifies any communities of practice that should not be included in the search list. A community may be included in the do-not-search list if the community was previously searched against the source community and no relationship was detected, as described below. Also, architecture 105 eliminates the current source community of practice from the search list.

Once the search list is generated, architecture 105 searches the profile for each of the communities of practice included in the search list (Step 930). In one embodiment, architecture may compare community of practice profile data for the source community with profile data of each community of practice included in the search list (e.g., first community profile against the second and third community of profiles). As the search is performed, architecture may determine whether there is any related information between the current source community of practice profile data and profile data for one or more of the communities of practice in the search list (Step 940). If there is (Step 940; Yes), the search process is directed to Step 820 of FIG. 8 to continue the analysis between this information for possible collaboration between the communities.

On the other hand, if architecture 105 determines there is no related information between the source and communities of practice in the search list (Step 940; No), architecture 105 may add the current source community of practice (e.g., the first community) to the do-not-search list (Step 960). Next, another community of practice within the environment is selected as the current source community of practice (e.g., the second or third community) (Step 970), and the process returns to Step 920 to generate a new search list, which now includes the previous source community of practice, to identify any related information that warrants collaboration between communities.

It should be noted, that methods and systems of the disclosed embodiments may perform any type of process that enables architecture 105, or another computing system, to search each of the communities of practice within an environment to ascertain if there is related information. As such, the exemplary processes described in FIG. 9 is not intended to be limiting. Any sequence of steps, or concurrent processing, process of elimination, etc. techniques may be programmed and/or employed by the disclosed embodiments to locate related information between communities of practice.

INDUSTRIAL APPLICABILITY

Knowledge management using the community of practice system and method of the current invention provide a way to permit interaction and collaboration between persons who have knowledge and persons who are seeking knowledge. The present invention supports internal collaboration among team members in an open environment that encourages participation. Further, the present invention provides for documentation of the knowledge, so that the knowledge is available globally and can be easily identified by those who are seeking it. Other benefits of the present invention include the ability to maintain up-to-date standards and best practices, the ability to quickly train new employees, and the ability to collaborate on an organization-wide level. Up-to-date standards and practices can be kept in a central electronic location, accessible by anyone in the organization, and when updates are required, suggestions can be solicited through the community of practice. New employees can be quickly trained, as all of the tools, standards, best practices, and training material are also available in one location. New employees also have the ability to interact with other employees to answer any questions that might arise. Collaboration on an organization-wide level is possible because e-mails containing new knowledge may be routed immediately to all members of the community of practice, while all tools and other materials are available in one location.

The present invention has clear benefits in helping divisions within an organization share information. For example, one division of a company may have identified a problem, but due to time or budget constraints, was unable to create a software program to analyze the problem. A second division of the company had created a spread sheet tool to analyze the problem; however, the tool was stored locally within the second division and was not accessible to the rest of the company, including the division that had identified the problem. In accordance with an embodiment of the present invention, a user in the second division may have submitted the tool to the community of practice where it was reviewed by experts and approved for use throughout the company. Since putting the tool into use, the tool may have been modified by various users in the community of practice based on their experiences. Thus, the division experiencing the problem would have this valuable corporate resource to draw upon.

As another example of the effective use of the present invention, a user in one division of an organization may post a question to an electronic bulletin board associated with the community of practice. In reply, the user may receive responses from persons throughout the organization. Some of the responses may provide answers or suggestions to the user's question; other responses may direct the user to a person knowledgeable about the topic or may direct the user to documentation existing in the knowledge database.

The community of practice system and method of the present invention has virtually unlimited potential uses. A community of practice may be established whenever there is a business requirement. In certain organizations, this may require notifying and obtaining support from a corporate coordinator. Once necessary approvals are obtained, a community of practice manager, associated experts, and any procedures, specifications, training, and standards that the community of practice would be responsible for are identified. Security levels and requirements would be determined for the community, as well as specific goals for the community to accomplish. Training may be provided as necessary for the community. The community of practice would then be opened in the organizational knowledge management system. Once the new community of practice is advertised, membership and subscriptions of users would be accepted. The progress of the community of practice can be measured with standard metrics. Once the original goals are achieved, the community of practice will continue to be an effective corporate resource.

Methods and systems consistent with the disclosed embodiments may be applied to community of practice environments to allow related communities to collaborate information and resources to achieve their respective goals and possibly merge into a single community of practice. In certain disclosed embodiments, a knowledge management system (e.g., architecture 105) may search communities of practice profile data to identify related communities of practice. Each of these potential candidate communities for collaboration (via a representative and/or computer system) may be notified to review the related information identified by the knowledge management system. Once the system is notified that the communities are related, it may establish a collaborative communications session between the communities that enable them to share members, expertise, software, hardware, knowledge documents, and any other form of resource to meet their assigned goals. Additionally, the communities may be merged if they are determined to have enough related information that warrants the merger.

In another embodiment, architecture 105 may be configured to receive profile data or other type of information from communities of practice for analysis. In this regard, architecture 105 may collect profile data or other type of information related to a community of practice from a set of communities in the community of practice environment. Based on this information, architecture 105 may determine whether two or more communities of practice are related, and if so, set up a collaborative communication session between the related communities and/or merge the related communities into a single community of practice.

Other aspects and features of the present invention can be obtained from a study of the drawings, the disclosure, and the appended claims.

What is claimed is:

1. A system for collaborating communities of practice, comprising:
    a community of practice environment including communities of practice, each including members and having a respective goal; and
    a knowledge management architecture comprising computer instructions stored on a computer-readable medium, which when executed by a processor cause a processor to:
        store a community of practice profile for each of the communities of practice, each community of practice profile including data reflecting characteristics of one or more community members,
        identify a first set of communities of practice that are related by comparing one or more community of practice profiles corresponding to the first set of communities, and
        set up a collaborative communication session between the communities of practice in the first set to enable the communities of practice in the first set to share resources, wherein the shared resources include knowledge documents of one or more communities of practice in the first set, to achieve their respective goals.

2. The system of claim 1, wherein the knowledge management architecture manages community of practice profiles for each of the communities of practice, each profile stored in a memory device accessible by a computer system within the knowledge management architecture and includes data reflecting characteristics associated with the respective community of practice.

3. The system of claim 1, wherein the knowledge management architecture is further configured to notify each of the communities of practice in the first set that they are related to another community of practice.

4. The system of claim 3, wherein the knowledge management architecture is further configured to receive a notification from at least one community of practice in the set that it is related to another community of practice in the set.

5. The system of claim 3, wherein the knowledge management architecture is further configured to receive a response from at least two of the communities of practice agreeing that they are related.

6. The system of claim 2, wherein the knowledge management system identifies related communities of practice by:
    comparing the community of practice profile of each of the communities of practice in the environment to determine whether any of the profiles include related data.

7. The system of claim 1, wherein the collaborative communication session between the communities of practice enables each of the communities of practice to at least one of: provide analysis results, provide software, provide hardware, provide members, provide expert advice, and provide knowledge documents to at least one other community of practice in the first set.

8. The system of claim 1, wherein the knowledge management architecture is further configured to manage a new community of practice reflecting a merger of the communities of practice included in the first set.

9. The system of claim 2, wherein the knowledge management architecture generates a new community of practice profile for a new community of practice that represents a merger of the communities of practice included in the first set, the new community of practice profile including data included in the community of practice profiles of each of the merged communities of practice.

10. A method for collaborating communities of practice in a community of practice environment, each community of practice including a goal, the method comprising:
    storing a community of practice profile for each of the communities of practice, each community of practice profile including data reflecting characteristics of one or more community members;

searching information associated with community of practice profiles which are associated with each of the communities of practice for related information;

identifying a set of communities of practice having related information;

determining whether any of the communities of practice in the set are related; and establishing a collaborative communication session between the related communities of practice such that the related communities of practice share resources, including information related to one or more goals of the related communities of practice, in achieving their respective goals.

11. The method of claim 10, wherein searching information includes:

searching a community of practice profile for each community of practice.

12. The method of claim 11, wherein identifying the set of communities of practice includes:

identifying at least two communities of practice having related community of practice profile data; and adding the at least two communities of practice to the identified set of communities of practice having related information.

13. The method of claim 10, wherein determining whether any of the communities of practice in the set are related includes:

receiving a notification from at least one of the communities of practice included in the set indicating that the at least one community of practice is related to at least one other community of practice in the set.

14. The method of claim 10, wherein each of the related communities of practice share resources by at least one of:

providing analysis results,
providing members,
providing software,
providing hardware, and
providing knowledge documents,
to at least one other community of practice.

15. The method of claim 10, further including:

merging the related communities of practice into a new community of practice.

16. The method of claim 15, wherein merging the related communities of practice includes:

creating a new community of practice profile for the new community of practice.

17. The method of claim 16, wherein creating the new community of practice profile includes:

merging data included in a community of practice profile for each of the related communities of practice into the new community of practice profile.

18. The method of claim 15, wherein the new community of practice includes a new goal reflecting at least one of the goals associated with at least one of the merged communities of practice.

19. The method of claim 15, wherein the new community of practice includes members from each of the merged communities of practice that collaborate to achieve a goal for the new community of practice.

20. The method of claim 19, wherein the members of the new community of practice use knowledge from the merged communities of practice to collaborate to achieve the goal for the new community of practice.

* * * * *